United States Patent
Burkhardt et al.

(10) Patent No.: US 9,976,878 B2
(45) Date of Patent: May 22, 2018

(54) ABSOLUTE MEASURING LENGTH MEASURING SYSTEM

(71) Applicant: Balluff GmbH, Neuhausen a.d.F (DE)

(72) Inventors: Thomas Burkhardt, Zell (DE); Achim Zern, Heilbronn (DE)

(73) Assignee: Ballufff GmbH, Neuhausen a.d.F. (DE)

( * ) Notice: Subject to any disclaimer, the term of this patent is extended or adjusted under 35 U.S.C. 154(b) by 0 days. days.

(21) Appl. No.: 15/387,960

(22) Filed: Dec. 22, 2016

(65) Prior Publication Data

US 2017/0184423 A1    Jun. 29, 2017

(30) Foreign Application Priority Data

Dec. 23, 2015 (DE) .................. 10 2015 122 829

(51) Int. Cl.
  *G01B 7/14* (2006.01)
  *G01D 5/249* (2006.01)
  *G01D 5/14* (2006.01)

(52) U.S. Cl.
  CPC ............. *G01D 5/2497* (2013.01); *G01D 5/14* (2013.01)

(58) Field of Classification Search
  CPC .................. G01D 5/2497; G01D 5/34746
  USPC ..................................... 324/207.24
  See application file for complete search history.

(56) References Cited

U.S. PATENT DOCUMENTS

| | | | |
|---|---|---|---|
| 6,760,682 B1 | 7/2004 | Schwabe | |
| 8,179,129 B2 | 5/2012 | Burkhardt et al. | |
| 9,041,385 B2 | 5/2015 | Kirste et al. | |
| 2001/0003422 A1 | 6/2001 | Andermo et al. | |
| 2004/0129870 A1* | 7/2004 | Strasser | G01D 5/2457 250/231.13 |
| 2010/0207617 A1* | 8/2010 | Novak | G01D 5/145 324/207.25 |
| 2011/0248709 A1 | 10/2011 | Shimizu et al. | |

FOREIGN PATENT DOCUMENTS

| | | |
|---|---|---|
| DE | 10 2008 055 680 A1 | 4/2010 |
| WO | 01/09568 A1 | 2/2001 |
| WO | 2011/131232 A1 | 10/2011 |

OTHER PUBLICATIONS

European Search Report dated May 9, 2017 in European Application No. 16 20 3670.1-1568 with English translation of the relevant parts.
German Office Action in DE 10 2015 122 829.7, dated Aug. 22, 2016, with English translation of relevant parts.

* cited by examiner

*Primary Examiner* — Reena Aurora
(74) *Attorney, Agent, or Firm* — Collard & Roe, P.C.

(57) ABSTRACT

In a length or position measuring system which has an at least locally substantially linear measuring gauge and at least one sensor to be moved relative to the measuring gauge, wherein the measuring gauge includes an incremental track and at least one absolute track and wherein the incremental track and the at least one absolute track have poles arranged in the longitudinal direction of the measuring gauge, the poles of the at least one absolute track form at least two regions in the sensor with different field strengths or signal amplitudes.

5 Claims, 5 Drawing Sheets

ABSOLUTE MEASURING LENGTH MEASURING SYSTEM

CROSS REFERENCE TO RELATED APPLICATIONS

Applicant claims priority under 35 U.S.C. § 119 of German Application No. 10 2015 122 829.7 filed Dec. 23, 2015, the disclosure of which is incorporated by reference.

BACKGROUND OF THE INVENTION

1. Field of the Invention

The invention relates to an absolute length measuring system or position measuring system having a preferably magnetically coded measuring gauge that has an incremental track and at least one absolute track.

2. Description of the Related Art

Incremental Measuring Systems

Magnetic strip length measuring systems have become known in the field of measuring technology, in which systems a sensor head is moved across a measuring gauge ("incremental track") that is periodically magnetized with changing polarity. Ideally, a sine-shaped and cosine-shaped sensor signal is generated in the sensor head or magnetic field sensor by the movement ("incremental sensor"). Depending on the magnetic measuring principle, the signal course repeats itself in the sensor head with each pole of the measuring gauge (e.g. in GMR or AMR sensors which measure the square of the magnetic flow density $B^2$) or with each pole pair of the measuring gauge (e.g. in Hall effect sensors which provide an output voltage that is proportional to the product of the magnetic field strength and current). The determination of the position on said incremental track takes place in a conventional manner, e.g. by means of trigonometric functions.

Absolute Measuring Systems with Several Tracks

There are several tracks on said measuring gauge. In addition to said incremental track of said incremental sensor, in an absolute measuring system, said sensor head contains at least one absolute sensor in order to sense one or more absolute tracks. Both the incremental sensor and the absolute sensor are thereby usually arranged in a communal sensor head housing. The incremental position specifies or feeds back the position of the sensor or sensor head within a pole or pole pair (depending on the physical measuring principle). The absolute position can be calculated using the following algorithm:

position(absolute)=position(in pole)+pole number*pole width.

In order to determine the pole number, a digital pseudo-random-coded (=PRC) track having logical values 0 and 1 corresponding to the N and S poles is usually used.

Also using or evaluating pole pairs in the form of a so-called "inverted code word" in addition to said individual poles of a measuring gauge originates from WO 01/09568 A1. In a magnetic measuring system of the N pole or the S pole, said coding of logical values is thus not carried out by one individual pole, but by at least two poles respectively summarized in said absolute track in the measuring direction. By doing so, such a pole pair has double the width of the incremental track, whereby a logical value is formed by the pole sequence N-S or the amended pole sequence S-N. The advantage of this arrangement of pole pairs is that, when a logical value 0 turns into 1 or a logical value 1 into 0, two adjacent, concordant poles always emerge. These concordant poles with doubled pole width can be better sensed than poles having only a single pole width because of the doubling of the field strength. Thus the air gap in particular in such a length measuring system can be increased.

SUMMARY OF THE INVENTION

The object of the invention is to state a length or position measuring system related here with which the number of said sensors required to evaluate said PRC track is reduced. Thus, the length of a PRC sensor array formed from the sensors for evaluating the PRC track is also shortened and thus also the housing length and the production costs.

The object of the invention is to provide a measuring gauge in an absolute measuring system related here, in which an absolute track or its poles are divided up by "scanning" or "division" so to say into further "lanes" or segments with the aid of regions of different field strength or signal amplitude.

Said logical values can be further refined by the mixture of N and S poles thus enabled such that e.g. half values, effectively by way of an "analogization" are also possible. Thus the number of measured values detected per sensor can be increased, and indeed by said 2 logical values (0 and 1) to e.g. five effectively analogously quantized values or quantization increments. Thus n sensors can not only detect $2^n$ poles, by, in the example, $5^n$ poles. Thus the measurable length increases or the length of the PRC sensor array becomes shorter.

Relative to purely digital code based on individual poles, the suggested concept offers the following advantages. Compared to binary codifying, fewer sensors are required for the same measurement length which results in turn in a cost advantage and the possibility of implementing a length measuring system related here in a shorter housing. A considerably greater distance between the measuring gauge and the sensor head can be achieved by the possibility of coding by means of pole pairs.

In a length or position measuring system related here, which has an at least locally substantially linear measuring gauge and at least one sensor to be moved relative to the measuring gauge, wherein the measuring gauge comprises an incremental track and at least one absolute track and wherein the incremental track and the at least one absolute track have poles arranged in the longitudinal direction of the measuring gauge, it is suggested in particular that the poles of the at least one absolute track form at least two regions in the sensor having different field strengths or signal amplitudes. In order to realize said analogously quantized magnetization, the poles of the at least one absolute track can be preferably divided into at least two segments or regions of different magnetization or field strength in order to enable said analogue or logical increment. It can further be provided that the at least one absolute track provides a mixture of poles of different polarity by means of which at least doubly incremented logical values are generated. Thus two or more segments can be used to realize a relatively weaker or relatively higher magnetization.

Alternatively, said segments or said analogue/logical increment can be implemented by a partial magnetization (compared to a 100% magnetization). Also, by means of such a partial magnetization, said analogue codification can thus be achieved.

It should further be noted that said substantially linear measuring gauge can also be formed by a ring-shaped or partially ring-shaped measuring gauge, wherein the measuring gauge is then formed to be at least locally linearly formed.

It can also be provided that the logical values of pole pairs provided by the absolute track are formed from
1. completely opposing over
2. partially opposing, over
3. neutral, over
4. partially concordant and
5. completely concordant relative to the corresponding pole pairs of the incremental track.

Thus a relatively simple realization of said increment is made possible. It can thus be provided in particular that the logical values provided by the absolute track vary between a value +1 and a value −1, wherein three of more intermediary steps are formed having e.g. the logical values 0.5, 0, and −0.5. By doing so, five logical values thus emerge.

(n+1) logical values can then be generated having n divisions, wherein as consistent a mixture of divisions as possible is nevertheless advantageous.

In the case of a length or position measuring system having magnetic poles, it can further be provided that a conversion of the signal amplitude arising in the absolute track for each pole pair in terms of a mean of zero is around +/−0.01 tesla during a 100% magnetization via around +/−0.005 tesla to zero and then again around +/−0.01 tesla in phase opposition In a sensor distanced from the measuring gauge, these values of the magnetization also allow a further safe sensing or detection of said incremented logical values. Preferably, in the case of a measuring distance or air gap of 6 mm, said conversion of the signal amplitude in terms of a mean of zero is around +/−0.007 tesla during a 100% magnetization via around +/−0.004 tesla to zero and then again to around +/−0.007 tesla in phase opposition.

The invention can not only be applied accordingly in magnetized measuring systems, but also in optical, capacitive, inductive or other measuring or effect principles, as long as each sensor or sensor head has a finite extension or size in the pole direction.

DETAILED DESCRIPTION OF PREFERRED EMBODIMENTS

Figure 1:
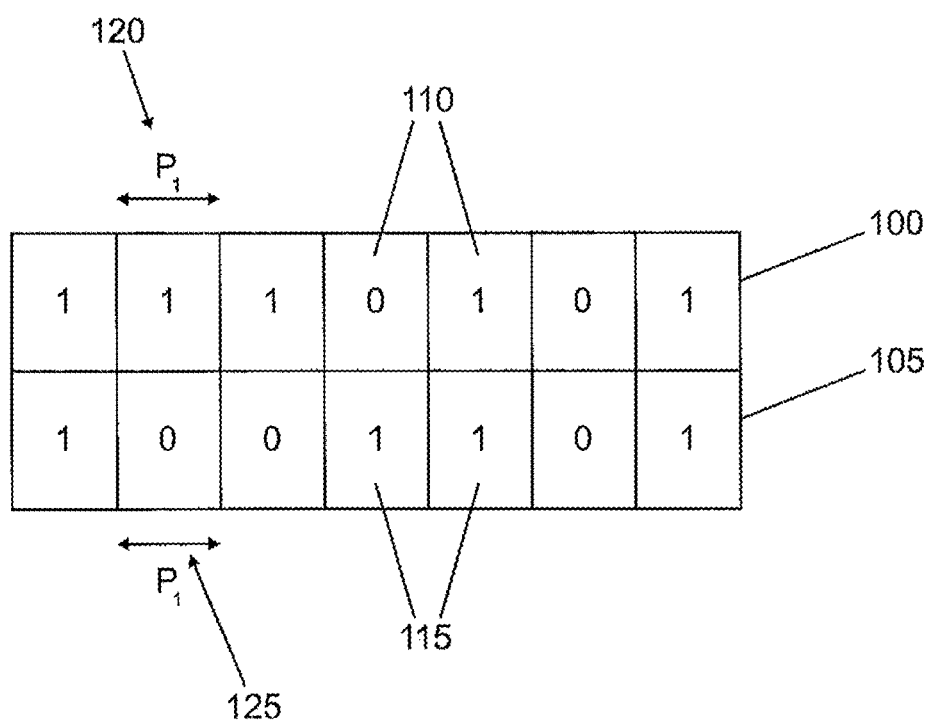
FIG. 1 shows a measuring gauge of a length measuring system related here having and incremental track (above) and a PRC track (below), according to prior art.

FIG. 1 schematically depicts a conventional, linear measuring gauge of a magnetic tape length measuring system related here having an incremental track 100 and a pseudo-random-coded (PRC) absolute track 105 that is connected fixedly or immovably to the incremental track 100. The incremental track 100 has binarily coded poles 110 and the absolute track 105 also has binarily coded poles 115. Both the absolute track 105 and the incremental track 100 respectively have a concordant pole width 'P1' 120, 125. Along with conventional application scenarios with a substantially linear measuring section, such a measuring gauge 100, 105 can also be arranged on the circumference of a shaft, e.g. a drive shaft of a wind turbine or similar which is not shown. The magnetic tape length measuring system thus serves to monitor or maintain the wind turbine, wherein the position of the drive shaft has to be precisely detected.

The subsequent exemplary embodiments are based on magnetic fields of varying strengths being able to be adjusted or modulated by a mixture of north and south poles or non-magnetized or partially magnetized regions. Thus, equally large N and S poles neutralize one another at a greater distance.

Figure 2:
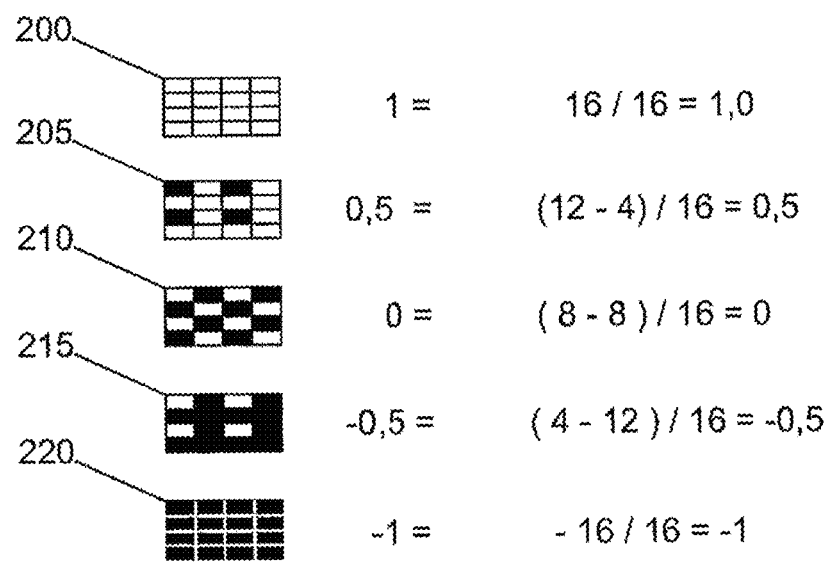
FIG. 2 shows an individual pole of a measuring gauge formed according to the invention of a length measuring system related here, and indeed having a five-stepped increment of the magnetic field.

In FIG. 2, a linear measuring gauge modified according to the invention in accordance with said mixture of north and south poles is depicted in the present case having five (5) analogue steps 200, 205, 210, 215, 220. The total magnetic field strength is determined by the arithmetic surface average value of the magnetic region. For example, the south pole 200 that is provided only with individual south pole elements or segments having the value +1 and the north pole 220 that is provided only with individual north pole segments having the value −1 are predetermined. Considering the number of 16 of the segments given in the present exemplary embodiment, the value +1 appears as the fraction $^{16}/_{16}$ and the value −1 appears as the fraction $−^{16}/_{16}$. In the present case, three intermediary steps result from these "threshold values" +1 and −1, and indeed by counting the segments accordingly: 0.5=(12−4)/16, 0=(8−8)/16 and −0.5=(4−12)/16.

Figure 3:
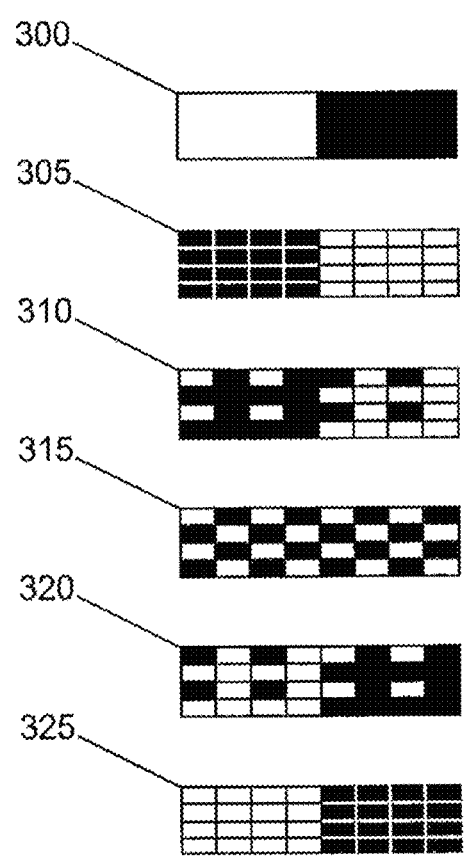
FIG. 3 shows a logical codifying of five values carried out according to the invention by means of a pole pair.

FIG. 3 depicts logical values 0, 1, 2, 3, 4 that are formed according to the invention by, relative to an incremental track, i.e. the individual, upper pole pair 300, the arrangement 305, 310, 315, 320, 325 performed in pairs of two poles of an absolute track (the lower five pole pairs). These logical values range from completely opposed 305 relative to the pole pair 300 of the incremental track, over partially opposed 310, over neutral 315, over partially concordant 320 and completely concordant 325 relative to the incremental pole pair 300.

Figure 4:
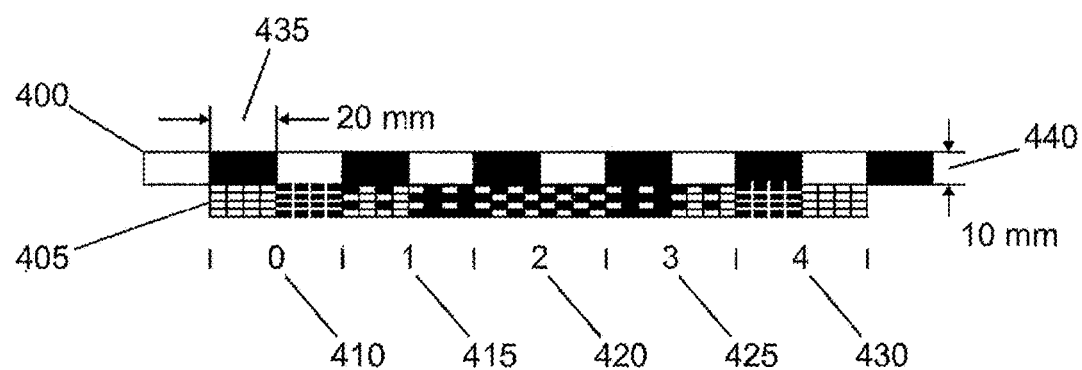
FIG. 4 shows an extract of an incremental track and an absolute track arranged thereon of a measuring gauge formed according to the invention of a length measuring system related here, wherein five "analogue" values are provided by means of the five steps shown in FIG. 2.

The extract depicted in FIG. 4 of a measuring gauge constructed according to the invention having an incremental track 400 and an absolute track 405 connected immovably to the incremental track 400 has a coding 410, 415, 420, 425, 430 of the absolute track 405 in the present exemplary embodiment, in which five analogue values 0, 1, 2, 3, 4 are coded according to the invention from the five (logical) steps shown in FIG. 3. These five values 410-430 vary relative to the incremental track 400 from completely opposed 410 to completely concordant 430.

The typical possible measurements of a measuring gauge 400, 405 related here are also shown in FIG. 4, namely a pole length 435 of 20 mm and a pole width 440 of the respective tracks 400, 405 of 10 mm. It should be noted that with a greater measuring distance or air gap, both the pole length and the pole width become larger.

Figure 5:
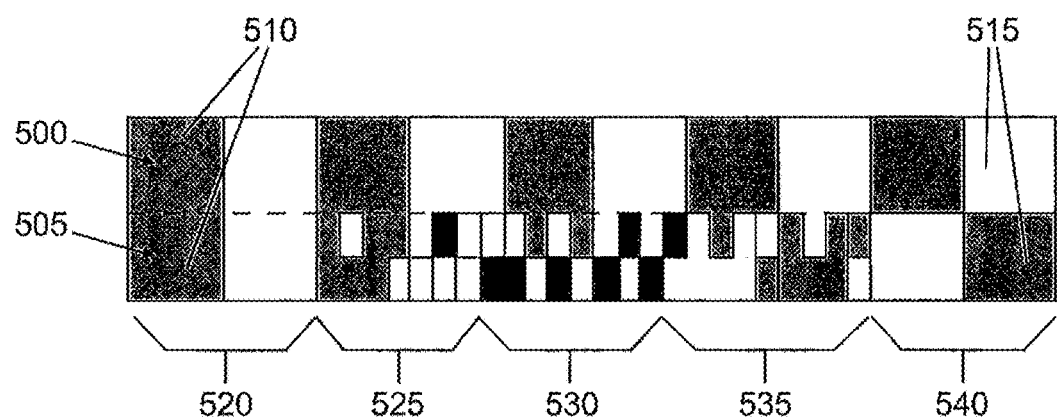
FIG. 5 shows a measuring gauge formed according to the invention having incremental and five-stepped PRC coding.

A simulation calculation of the magnetic field strength shown in FIG. 5 was carried out in the Z direction in grayscale value increments, i.e. starting from the paper level in FIG. 4, by a measuring gauge which is similar to the measuring gauge shown in FIG. 4. In the depiction, a white colour value means a very negative field strength, correspondingly a grey value means a very positive field strength and the black areas mean even more positive field strengths compared to the grey areas, wherein in the present case it does not depend on the absolute field strength values and these are thus not depicted in the diagram. As in FIG. 4, the incremental track 500 is located above and the absolute track 505 below. Similarly, the change from a concordant pole pair (left) 510 to an opposed pole pair (right) 515 with the corresponding five steps 520, 525, 530, 535, 540 is depicted.

With the measuring gauge 500, 505 assumed in the simulation, the number of magnetic elements is different to the measuring gauge 400, 405 shown in FIG. 4, wherein, additionally, each pole is not made up of 16 segments, but of 8 segments, yet the resulting magnetic increment is identical. The results of the simulation are thus correspondingly rougher. Therefore, this simplification took place in order to limit the simulation complexity.

It should be noted that $x=m^n$ values or poles can clearly be identified in general in the case of implementation with n analogue sensors for reading m-fold analogously quantized steps. The number of sensors is thus advantageously reduced compared to an implementation known from prior art by two (binary) logical values, i.e. m=2. In this way, when m=5 values and four sensors for example, $5^4=625$ poles can clearly be recognized or when m=2 (according to prior art) with four sensors, $2^4=16$ poles can clearly be recognized. In order to be able to clearly recognize 625 poles with prior art, ten sensors would be required since $2^{10}=1024$. Thus, for example, nine sensors would not suffice. For these reasons, a considerable cost advantage and a considerable construction size advantage of the invention emerge, since only four instead of ten sensors are necessary.

Figure 7A:
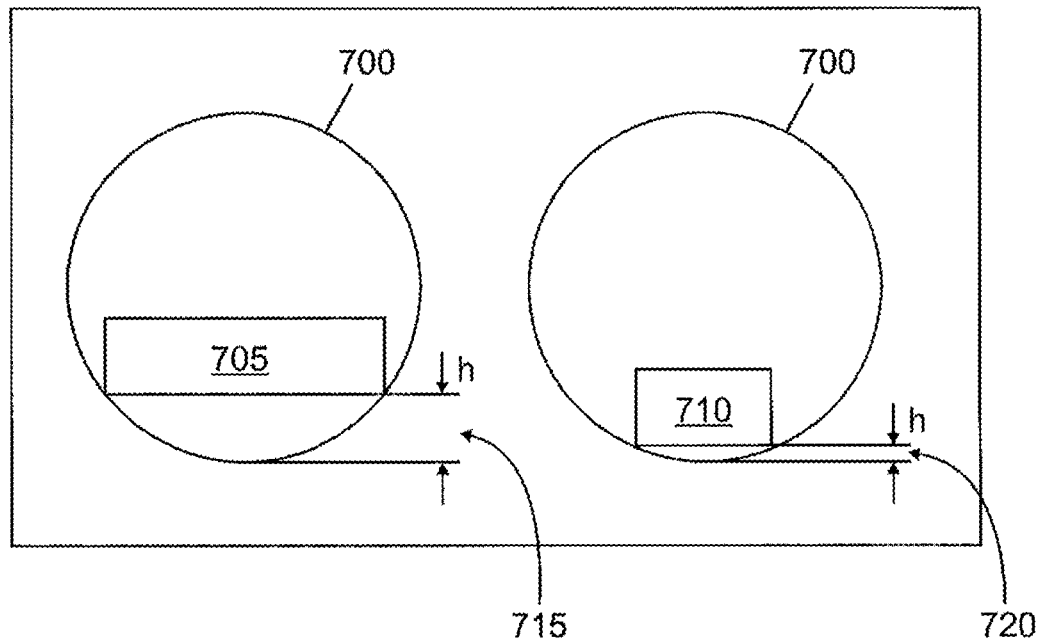
FIG. 7a, b illustrate two exemplary geometric influences of the housing length on the measuring resolution of a curved measuring gauge.
Figure 7B:
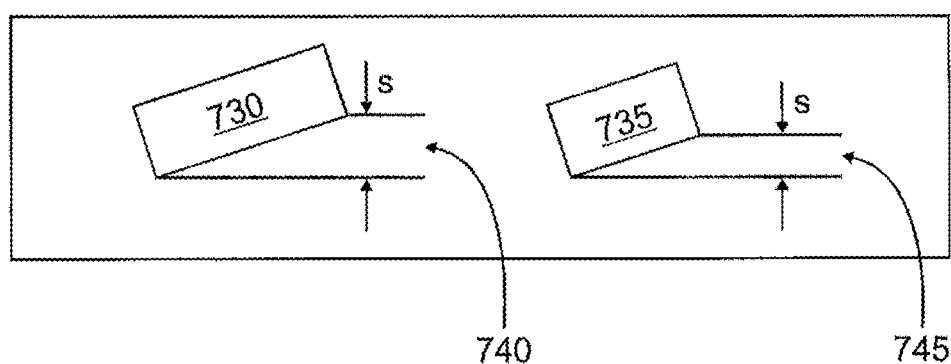

As is apparent in FIGS. 7a and 7b, a relatively small construction size or relatively small housing length 705, 710 or 730, 735 is an advantage in a ring-shaped measuring gauge 700, since the height of the secant 715, 720 or 740, 745 is respectively smaller and thus the field strength at the site of the magnetic field sensors (not shown) is greater.

Figure 6A:
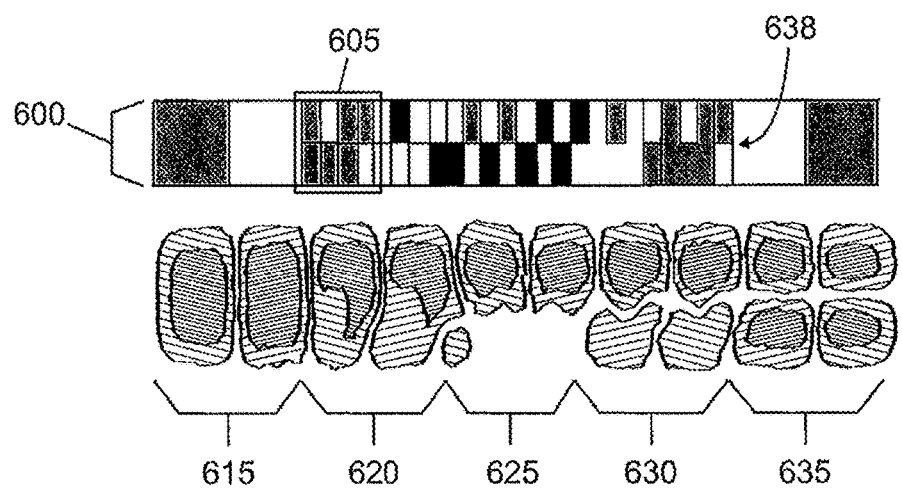
FIG. 6a, b show a simulation of the magnetic field strength in a PRC measuring gauge without an incremental track codified analogously according to the invention.
Figure 6B:
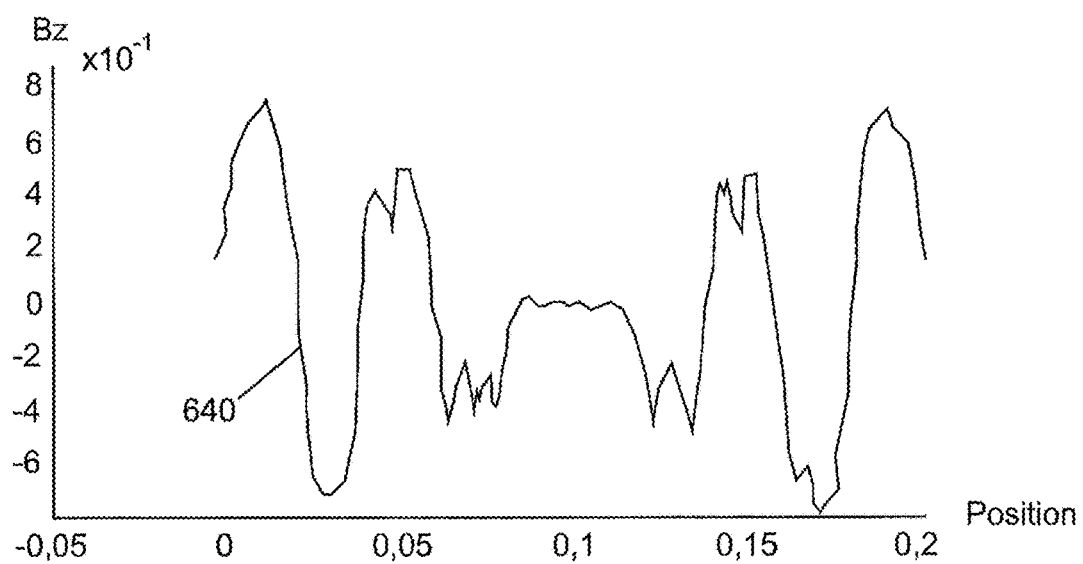

In FIGS. 6a and 6b, simulation results for a measuring gauge having an incremental track (above) and an absolute track (below) are depicted. The corresponding upper partial figure shows the field strength at a distance of 0 mm, i.e. directly on the surface of the measuring gauge and the lower partial figure shows the field strength arising at a distance of 6 mm. From this (upper) diagram, the rough modulation, similar to the absolute track 505 shown in FIG. 5, is very clearly recognizable. Each pole is thus (as in FIG. 5) depicted by a 2*4 element sized field 605. The field strength is changed respectively in a 2*2 element sized field by modifying an element for modulating.

In contrast, in the lower diagram in FIG. 6a, the field strength is depicted at a distance of Z=6 mm from the absolute track 600 of the measuring gauge. With the shading shown in the lower partial image, a darker shade of the respective shading corresponds to a greater value of the respective field strength. The modulation caused by the large field elements is still sufficiently recognizable for the detection or sensing, despite the clearly greater distance. In particular, the analogue increment is able to be sufficiently distinguished or measured by means of the five steps 615, 620, 625, 630, 635.

With the measurement curve 640 shown in FIG. 6b, the field strength Bz (ordinate) is applied exactly in the middle of the absolute track 600 (as indicated by the arrow 638), and indeed in the unit milli-tesla (mT) above the position in the unit m (abscissa). The conversion of the amplitude emerging with each pole pair in terms of the value Bz=0 can be easily recognized. The amplitude changes from +/−7 mT during a 100% magnetization via +/−4 mT to zero and then back to +/−7 mT in phase opposition. Such a change in amplitude can be very easily detected by the magnetic sensors known from prior art.

The magnetic field amplitudes change significantly depending on the distance from the measuring gauge. The behaviour of the amplitudes in the individual regions however remains substantially constant. The measuring signal from the incremental track has a similar amplitude progression as that of the measuring signal obtained by the absolute track, since the sensors for both the tracks are the same distance from the measuring gauge. If these two signals were placed in relation to each other, the described dependency on distance would be compensated such that the 5 steps for example can clearly be recognized across the entire working region.

The described measuring gauge or the described length measuring system and the described method for operating it, can preferably be used in a magnetic tape length measuring system with the advantages described herein. Furthermore, the device and the method however can be principally used in all rotary and linear positioning, measuring, movement speed or speed of revolution monitoring. In addition, the method can not only be used with the magnetic tape length measuring system described herein or the magnetic measuring systems with said advantages, but also in all kinds of incremental and absolute measuring systems as well, e.g. inductive, optical or capacitive measuring systems or similar. In the non-magnetic measuring systems mentioned last, the concepts and principals described herein are able to be used analogously.

What is claimed is:

1. A length or position measuring device which has an at least locally substantially linear measuring gauge and at least one sensor to be moved relative to the measuring gauge,
    wherein the measuring gauge comprises an incremental track and at least one absolute track,
    wherein the incremental track and the at least one absolute track have poles arranged in the longitudinal direction of the measuring gauge,
    wherein the poles of the at least one absolute track are divided into at least four segments,
    wherein logical values of pole pairs provided by the absolute track are formed from at least completely opposed, over partially opposed, over neutral, over partially concordant, and completely concordant compared to the corresponding pole pairs of the incremental track, thus providing at least five logical values +1, +0.5, 0, −0.5, and −1, and
    wherein the at least one absolute track provides a mixture of poles of different polarity or of different magnetization such that the at least five logical values are generated.

2. The length or position measuring device according to claim 1, wherein the absolute track is divided into at least sixteen segments, wherein the logical values provided by the absolute track vary between a positive value and a negative value, and wherein at least three intermediate steps with logical values between them are formed.

3. The length or position measuring device according to claim 1, wherein $m^n$ poles are able to be detected by n sensors and by m quantization steps.

4. The length or position measuring device according to claim 1, wherein a conversion of the signal amplitude arising in the absolute track for each pole pair in terms of a mean of zero is around +/−0.01 tesla with a 100% magnetization via around +/−0.005 tesla to zero and then again in opposition in phase at around +/−0.01 tesla.

5. The length or position measuring device according to claim 4, wherein the conversion of the signal amplitude at a distance of 6 mm from the measuring gauge in terms of the mean of zero is about +/−0.007 tesla with a 100% magnetization via about +/−0.004 tesla to zero and then again in phase opposition at around +/−0.007 tesla.

* * * * *